Jan. 1, 1952 H. F. SCHWARZ ET AL 2,580,612
ELECTRIC CONDENSER
Original Filed Aug. 27, 1945
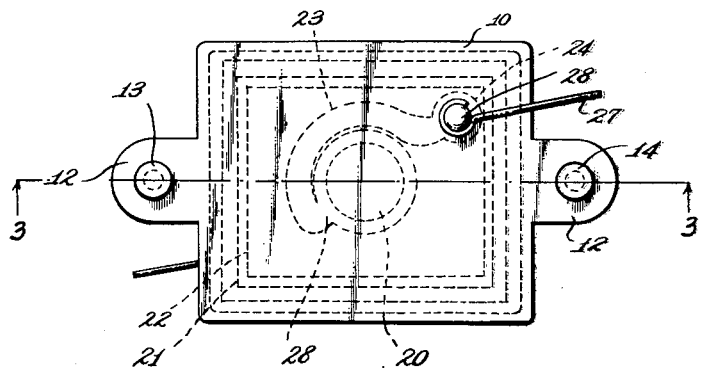
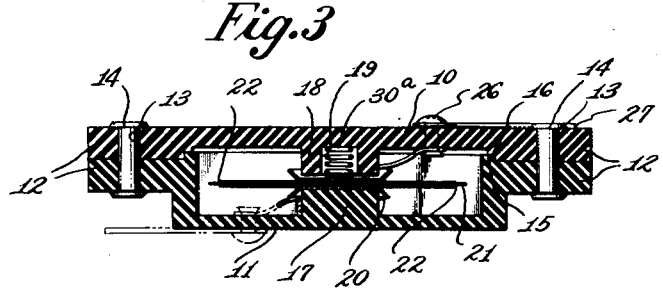
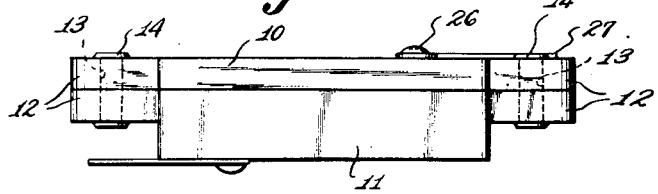
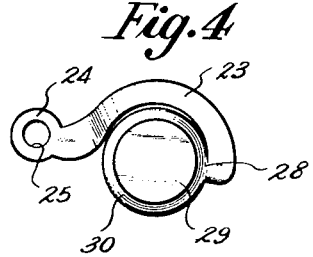
INVENTORS
HARVEY F. SCHWARZ
BY WILLIAM J. O'BRIEN
Walter P. Huntley
Attorney Patented Jan. 1, 1952

2,580,612

UNITED STATES PATENT OFFICE 2,580,612

ELECTRIC CONDENSER

Harvey Fisher Schwarz and William Joseph O'Brien, London, England, assignors to The Decca Record Company, Limited, London, England, a corporation of Great Britain Original application August 27, 1945, Serial No. 613,004. Divided and this application April 5, 1950, Serial No. 163,582. In Great Britain February 29, 1944

Section 1, Public Law 690, August 8, 1946
Patent expires February 29, 1964

1 Claim. (Cl. 175—41)

This invention relates to electric condensers, and particularly those of the silvered mica type, and has for an object to provide a condenser having a high degree of stability in respect of capacity. One of the factors which affects the stability of a condenser is variation in humidity conditions of the atmosphere and one of the common ways of rendering small condensers immune to such changes, is hermetically to encase them in wax, or the like, after the outer metal surfaces have been covered by layers of material having good insulating properties. Unless these layers, however, adhere securely to the metal surfaces, there is a danger of the encasing wax creeping between them and the metal, thereby altering the capacity of the condenser, due to the presence of high di-electric material at the metal edges. Furthermore, the stability is affected by the unstable electrical properties of the wax, such as its unstable temperature coefficient. Furthermore, the attachment of the conductors to the plates of the condenser also renders it difficult to maintain the close adherence of the outer layers to the metal surfaces, and also presents certain other manufacturing difficulties.

This application is a division of a copending application filed by Harvey Fisher Schwarz and William Joseph O'Brien, Serial No. 613,004, filed August 27, 1945, and entitled Electric Condensers, now abandoned.

According to the present invention, an electric condenser comprises a two-part casing of comparatively rigid insulating material in which are housed condenser plates comprising outer layers of metal separated by di-electric, each of which housing parts is provided with a metal contact adapted to engage respectively the outer layers of metal, at least one of which contacts is resiliently mounted on its part of the casing, means for clamping said parts of the casing together, and means for attaching leads to said contacts. It will be appreciated that this arrangement eliminates the necessity of encasing the condenser plates in wax, and the possibility of the wax creeping between the plates. Furthermore, it eliminates the difficulty of attaching the leads to the metal layers.

Preferably, the metal contacts are arranged to lie wholly within the area of the outer metal layers, whereby the contacts are screened from one another.

Each of the aforesaid contacts may comprise a flat abutment face arranged to contact with one of the aforesaid metal layers, and secured to its casing part by a flexible arm which enables the flat abutment face to accommodate itself to the metal layer under the action of said resilient means. For example, each contact may be formed from pliable metal sheet, shaped to provide an arm which at one end is attached to the casing part, and the other end of which provides the aforesaid abutment face. The abutment face may be maintained in contact with the metal layer, either by reason of the resilience of the arm or by reason of an additional resilient member disposed between the abutment face and the part of the casing. In one construction, the aforesaid contact may be shaped in the form of a question-mark, one end of which is secured to the casing part as by a rivet, and the other end is provided with a flat abutment face comprising a disc formed integrally with the curved part of the arm, but severed therefrom, except for a short neck. In order to stiffen the disc, it may be embossed. The leads for the contacts are secured on the outside of the casing by the same rivets which attach the contacts to the casing.

The aforesaid two-part casing may be rectangular or circular in configuration, a spigot connection being provided between the two parts. The casing parts may be moulded from a plastic.

Each part of the casing may be provided with an upstanding boss or projection opposite the flat abutment face of the contact. One or each of said bosses may be provided with a small helical spring for engaging the flat abutment face.

The following is a description of one embodiment of the invention, reference being made to the accompanying drawings, in which:

Figure 1 is a plan view of the condenser casing showing certain parts dotted;

Figure 2 is a side elevation of the arrangement shown in Figure 1;

Figure 3 is a section on the line 3—3 of Figure 1, and

Figure 4 is a plan view of one of the contacts.

As will be seen from Figure 2, the condenser casing is formed in two parts 10 and 11, each having the same peripheral contour and provided with lugs 12 having holes 13 therein for receiving tubular rivets 14, as shown in Figures 1 and 2. A spigot joint is provided between the two parts of the casing by means of an upstanding ridge 15 in the part 11 engaging a recess 16 in the part 10. The part 11 is provided with a central solid boss 17 while the part 10 is provided with a somewhat longer boss 18 having a central bore 19 therein. The lengths of the two bosses are such as to provide a sufficient gap between them for accommodating two contacts 20 arranged one on either side of a rectangular condenser plate 21. The condenser plate is of such a size as to leave a small gap between its edges and the walls of the casing. The condenser plate may be formed in the manner described in co-pending United States patent application No. 613,003, now abandoned, by spraying metal on to the opposite sides of a sheet of di-electric which is masked so as to leave a marginal portion 22 uncovered. Each contact may be stamped from thin pliable metal sheet so as to have a shape as shown in Figure 4. As will be seen, it comprises an arm 23 somewhat in the shape of a query mark, having at one end a small circular plate 24 perforated at 25 for receiving a rivet 26 by which it is attached to the inside of one of the casing parts, which rivet is also employed for connecting a lead to the contacts from the outside of the casing. The other end of the arm 23 is connected by a narrow neck 28 to a disc which is embossed to provide a flat central portion 29 from which extends a conical flange portion 30, which provides the disc with the required amount of rigidity. The flat portion of each embossed disc is arranged over one or other of the bosses 17 or 18 on the casing parts. The hollow boss 18 is provided with a small compression spring 30a which engages one of the contacts and presses it, together with the condenser plate, against the other contacts and against the solid boss 17. After the parts have been assembled in the above manner, the assemblage may be encased in wax.

Instead of the two-part casing being enveloped in wax the two edges of the parts of the casing before assemblage may be coated with a suitable sealing material or adhesive so as hermetically to seal the joints.

In order still further to enhance the stability of the condenser the interior of the two-part casing may be supplied with an inert atmosphere, such as nitrogen. For this purpose, one of the casing parts may be provided with a small aperture, or leakage between co-operating edges of the two casing parts may be utilised, and after the aforesaid parts have been assembled, they are placed in a chamber, which is first evacuated and then supplied with nitrogen, after which, means may be provided for closing the aperture while still in the compartment, or for sealing the edges.

We claim:

In an electrical condenser, the combination of: a condenser unit comprising a sheet of mica di-electric, a layer of metal deposited on both sides thereof to provide the first and second electrodes of said condenser; a support for said unit including a pair of electrode contact means engaging said unit on opposite sides of said sheet at points spaced from the edges thereof and each comprising a flexible arm terminating in a flat abutment face formed integrally therewith and engaging one of said electrodes, the lateral extent of said contact means in the plane of said electrodes being less than that of said electrodes, a casing of relatively rigid insulating material defining an interior cavity for containing said unit, the dimensions of said cavity exceeding the dimensions of said unit to leave a free space all around said unit, and means securing said arms of said contact means to said casing on opposite sides of said cavity for supporting said condenser unit between said abutment faces in a position extending said condenser unit between and beyond said lateral extent of said contact means, whereby said condenser unit provides a capacity shield between said contact means to provide a housed condenser having a capacity which does not exceed the capacity of said condenser unit by more than ½ mmfd.

HARVEY FISHER SCHWARZ.
WILLIAM JOSEPH O'BRIEN.

REFERENCES CITED

The following references are of record in the file of this patent:

UNITED STATES PATENTS

| Number | Name | Date |
|---|---|---|
| 1,899,540 | Towne | Feb. 28, 1933 |
| 2,078,284 | Schrader | Apr. 27, 1937 |
| 2,303,391 | Rosenthal | Dec. 1, 1942 |
| 2,304,764 | McAllister | Dec. 8, 1942 |

FOREIGN PATENTS

| Number | Country | Date |
|---|---|---|
| 518,127 | Great Britain | Feb. 19, 1940 |